US009127808B2

(12) United States Patent
Divisi

(10) Patent No.: US 9,127,808 B2
(45) Date of Patent: Sep. 8, 2015

(54) MINIMAL LUBRICATION DEVICE

(75) Inventor: Walter Divisi, Monaco (MC)

(73) Assignee: DROPSA S.P.A., Milan (IT)

(*) Notice: Subject to any disclaimer, the term of this patent is extended or adjusted under 35 U.S.C. 154(b) by 509 days.

(21) Appl. No.: 12/952,393

(22) Filed: Nov. 23, 2010

(65) Prior Publication Data

US 2011/0120802 A1 May 26, 2011

(30) Foreign Application Priority Data

Nov. 26, 2009 (IT) ............................. MI09A002084

(51) Int. Cl.
| F01M 1/00 | (2006.01) |
| F01M 11/00 | (2006.01) |
| F16N 7/36 | (2006.01) |
| F16N 7/38 | (2006.01) |
| F16N 13/00 | (2006.01) |
| F16N 7/14 | (2006.01) |
| F16N 13/10 | (2006.01) |
| F16N 7/30 | (2006.01) |
| F16N 7/34 | (2006.01) |
| F16N 7/32 | (2006.01) |
| F16N 25/02 | (2006.01) |

(52) U.S. Cl.
CPC . *F16N 7/32* (2013.01); *F16N 25/02* (2013.01)

(58) Field of Classification Search
CPC .............. F16N 25/02; F16N 7/32; F16N 7/34
USPC ........................ 184/55.1, 6.26, 6.28, 26, 27.1
See application file for complete search history.

(56) References Cited

U.S. PATENT DOCUMENTS

| 3,995,717 | A | * | 12/1976 | Kroffke | .......................... 184/7.4 |
| 4,859,987 | A | | 8/1989 | Markus | |
| 5,024,584 | A | * | 6/1991 | Bordini et al. | ................. 417/342 |
| 5,042,618 | A | * | 8/1991 | Switalski et al. | ............ 184/6.26 |
| 5,205,378 | A | * | 4/1993 | Boelkins | ....................... 184/55.1 |
| 5,275,539 | A | * | 1/1994 | Custer et al. | ................... 417/401 |
| 5,368,746 | A | * | 11/1994 | Gryder | ........................... 210/739 |
| 5,513,722 | A | * | 5/1996 | Foltz | ............................. 184/55.2 |
| 5,524,729 | A | * | 6/1996 | Boelkins | ...................... 184/55.1 |
| 5,542,498 | A | * | 8/1996 | Boelkins | ......................... 184/7.4 |
| 5,725,071 | A | * | 3/1998 | Brice | ............................ 184/6.26 |

(Continued)

FOREIGN PATENT DOCUMENTS

| DE | 3841265 A1 | 12/1988 |
| EP | 0 314 969 A2 | 5/1989 |

(Continued)

OTHER PUBLICATIONS

U.S. Appl. No. 12/952,444-"Minimal Lubrication Device" filed Nov. 23, 2010.
U.S. Appl. No. 12/952,481-"Device for Oil or Fluid Grease Lubrication" filed Nov. 23, 2010.

*Primary Examiner* — Henry Liu
(74) *Attorney, Agent, or Firm* — Novak Druce Connolly Bove + Quigg LLP

(57) ABSTRACT

A minimal lubrication device including a storage reservoir for a lubricant fluid and a pump for the lubricant, the pump being of high pressure type with its delivery port connected to at least one modular element adapted to mix a compressed air flow with the lubricant. The modular element presenting a mixer element fed with a compressed air flow into which an outlet of a flow regulator fed by the lubricant originating from the pump opens.

15 Claims, 6 Drawing Sheets

(56) References Cited

U.S. PATENT DOCUMENTS

| | | | |
|---|---|---|---|
| 6,065,689 | A | 5/2000 | Kizer et al. |
| 6,131,471 | A | 10/2000 | Okoren et al. |
| 6,161,395 | A | 12/2000 | Okoren et al. |
| 7,665,578 | B2 * | 2/2010 | Grozinger .................... 184/55.1 |
| 2002/0144865 | A1 | 10/2002 | Clancy et al. |
| 2004/0140161 | A1 * | 7/2004 | Clancy et al. ................ 184/55.1 |

FOREIGN PATENT DOCUMENTS

| | | |
|---|---|---|
| EP | 0 493 982 A1 | 7/1992 |
| EP | 1 275 895 A1 | 1/2003 |
| GB | 870632 | 6/1961 |

* cited by examiner

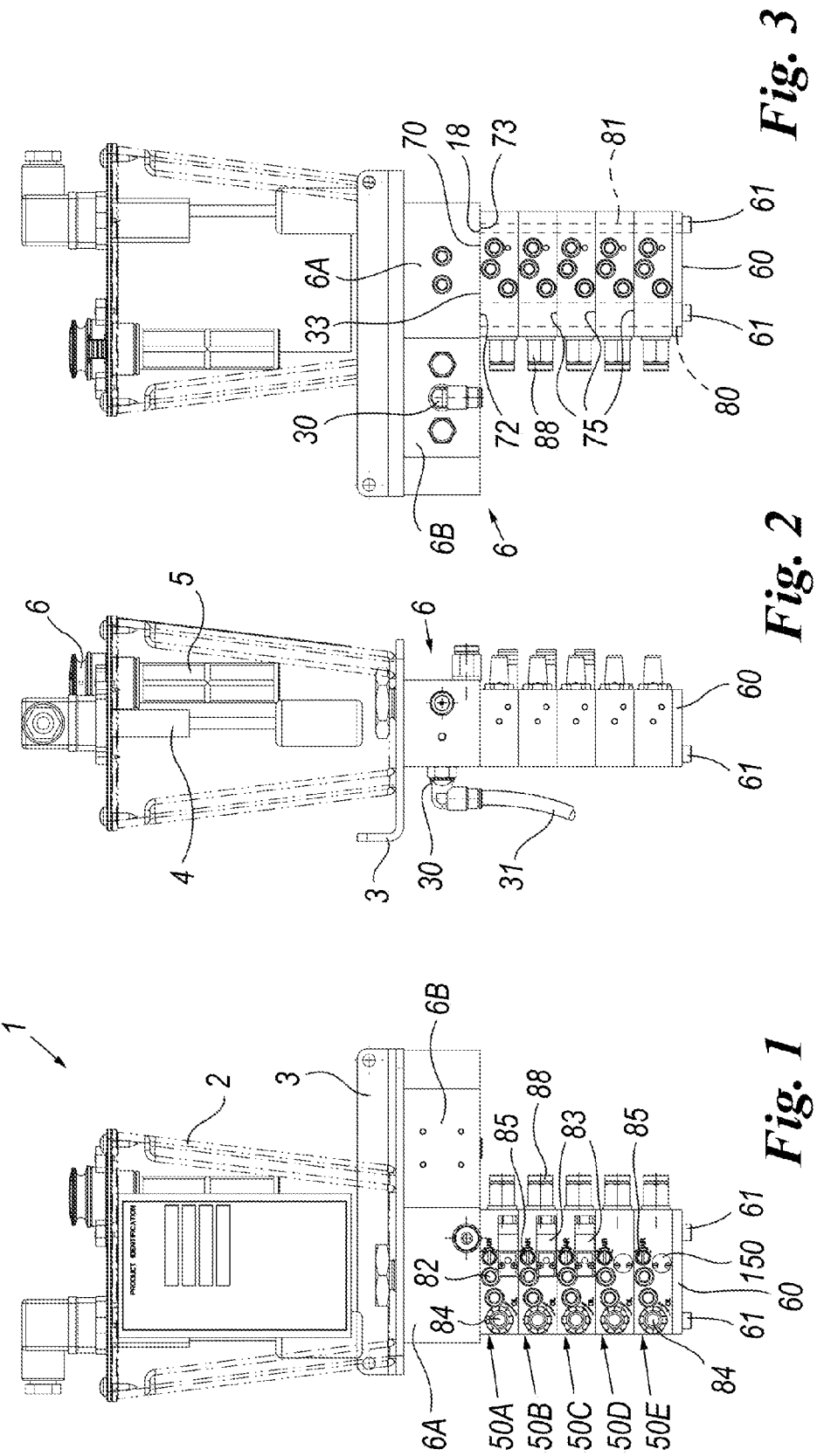

MINIMAL LUBRICATION DEVICE

CROSS REFERENCE TO RELATED APPLICATIONS

This application claims the priority of Italian Patent Application No. MI2009A002084 filed on Nov. 26, 2009.

The present invention relates to a minimal air/oil lubrication device.

More particularly, it relates to a modular device.

Air/oil lubrication represents a relatively recent reality, and is the result of the introduction of advanced technologies which have enabled it to be applied mainly in the field of dry machining. It has also replaced traditional spray systems because of their negative environmental impact.

Essentially, the lubrication takes place by feeding a continuous air flow which provides not only a transport means for the oil as far as the lubrication point, but also a cooling means for those members to be lubricated and for the lubrication system.

The oil, injected into the air flow at regular intervals, covers the surfaces to be lubricated, so reducing friction and wear.

Air/oil lubrication devices are currently of two types.

A first device type comprises an oil reservoir which is pressurized by a compressed air source. The oil pressurized in this manner is fed to a needle valve having an exit coupled to a conduit through which compressed air flows.

The lubricant flow leaving the valve is hence transported by the compressed air and led towards the lubrication region.

This system presents the drawback of being sensitive to the pressure present at the lubrication point on the user side. In this respect, the greater the pressure at that point the greater is the pressure of the transport air present in the conduit into which the oil is delivered, with a consequently lesser oil quantity injected into the flow. As is known, the oil quantity flowing through an orifice (needle valve) depends on the pressure difference between the conduit into which said oil is delivered and the initial fluid pressure (pressure in the oil reservoir). Consequently such a device type cannot be used if a user is present in which the pressure at the delivery point undergoes considerable variation.

It also has the drawback of using a pressurized oil reservoir. This means that the system has to be halted, so depressurizing the reservoir, each time that the lubricant has to be topped up.

A different lubrication device type, more suitable for these variable pressure conditions, presents an oil reservoir at atmospheric pressure. An oil line leaves the reservoir to feed a plurality of positive displacement micro-pumps operated by compressed air.

Each of these micro-pumps delivers a preset volume of lubricant into a conduit through which compressed air flows. In this manner the lubricant quantity is constant even if the air flow decreases due to any overpressure arising in the region to be lubricated (user side).

These devices present the drawback of being costly. In this respect, each lubrication point must be provided with a respective pump connected in parallel with those already present, and fed by the reservoir. The pump is also connected to the compressed air line. Moreover, the oil delivery is not continuous but pulsed.

An object of the present invention is therefore to provide an air/oil lubrication device which represents an improvement over the known art, while at the same time being less costly and of higher performance.

These and other objects are attained by an air/oil lubrication device in accordance with the teachings of the accompanying claims.

Further characteristics and advantages of the invention will be more apparent from the description of a preferred but non-exclusive embodiment of the air/oil lubrication device, illustrated by way of non-limiting example in the accompanying drawings, in which:

FIGS. 1, 2 and 3 are respectively a front, side and rear view of the device of the present invention;

Figure 4:
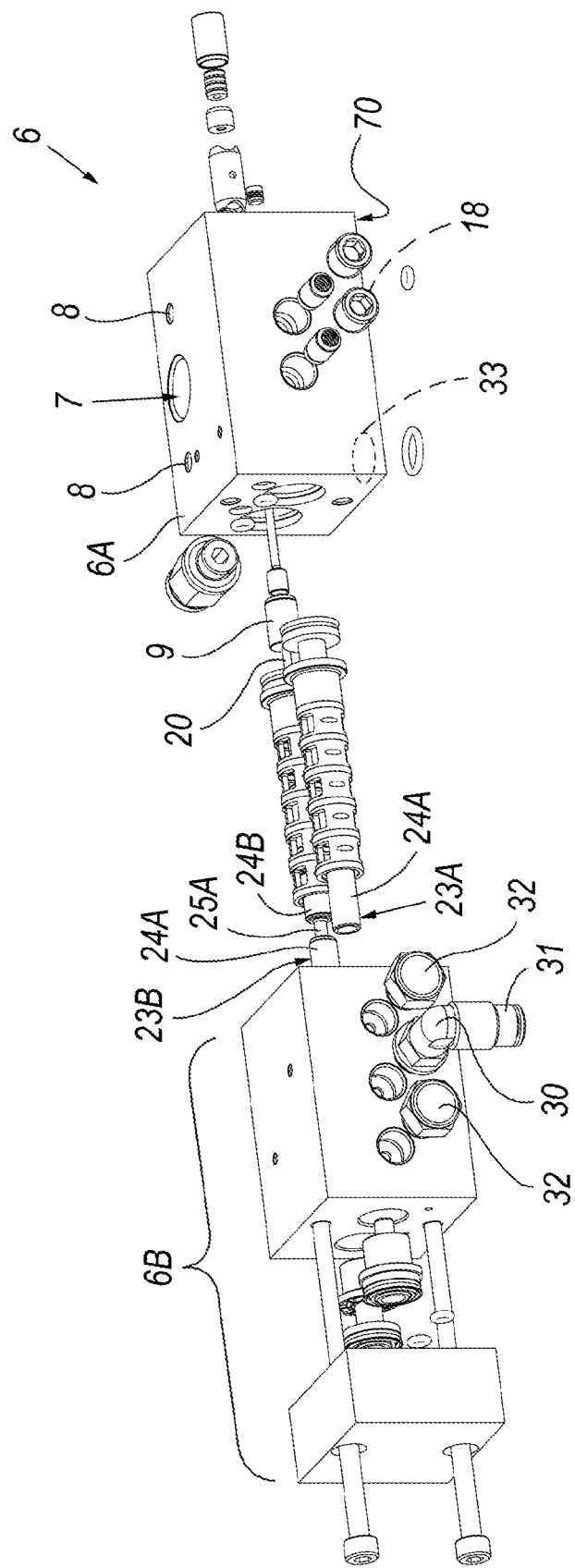
FIG. 4 is an exploded view of a high pressure pump present in the device of FIG. 1.

With reference to said figures, these show an air/oil lubrication device indicated overall by the reference numeral 1.

It comprises a lubricant fluid storage reservoir 2 supported by a plate 3 to which the device is fixed. The reservoir comprises an element (for example of float type) for sensing the fluid level within it, and a filter 5 associated with an aperture 6 for feeding lubricant into the reservoir. The fixing plate 3 comprises a conduit connecting one end of the reservoir to the suction port of a high pressure pump 6 fixed below the plate.

Figure 5:
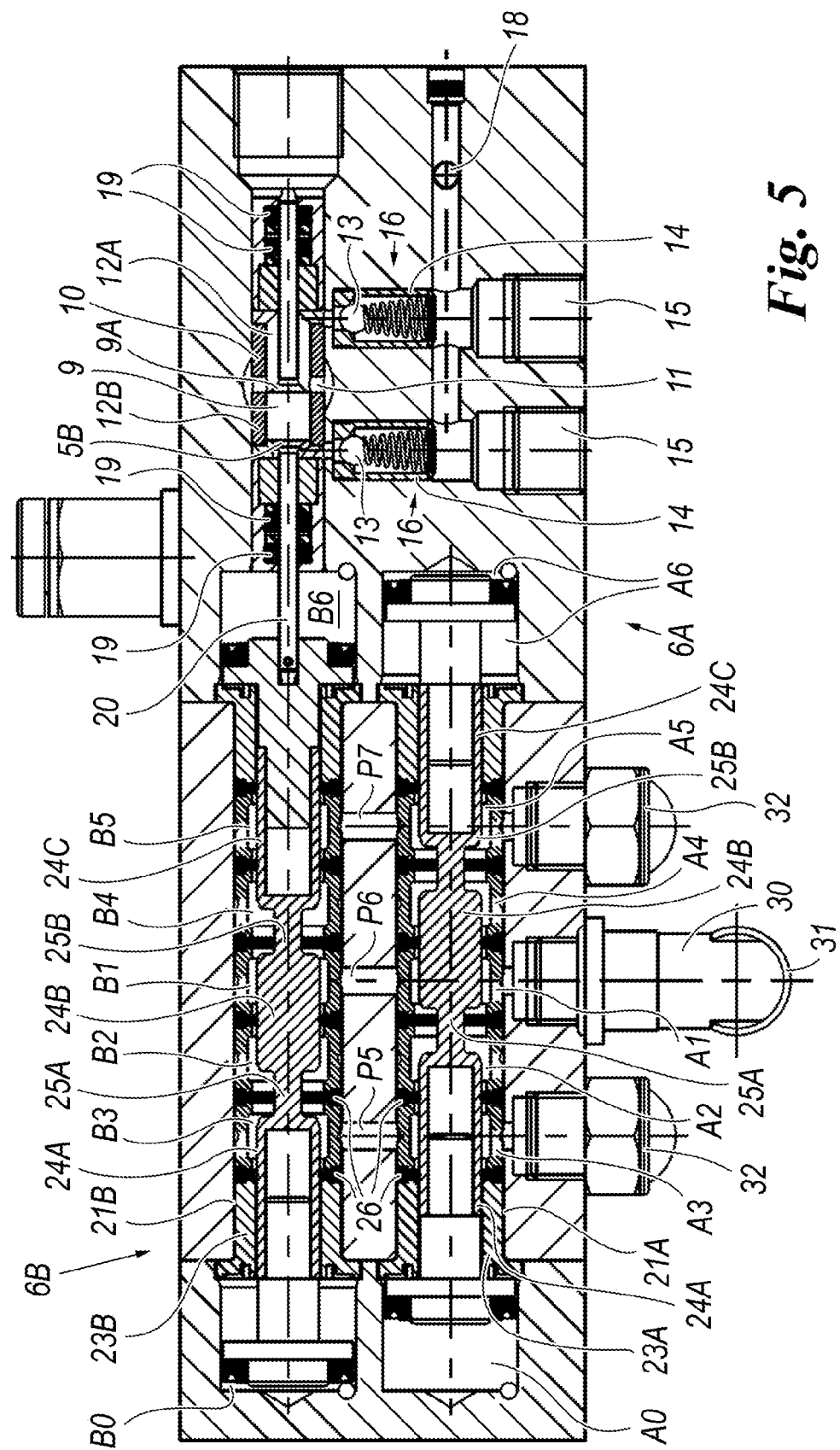
FIG. 5 is a section through the pump of FIG. 4.

The conduit feeds lubricant fluid from the reservoir 2 to the suction port 7. The pump 6 comprises a first hydraulic block 6A for pumping the fluid via a cylinder 9, and a second pneumatic block 6B for operating the cylinder 9. The cylinder 9 of the hydraulic block slides within a compression chamber. The compression chamber 10 centrally comprises a fluid feed port 11 connected to the suction port 7. The port 11 essentially divides the compression chamber into a first chamber 12A and a second chamber 12B. The cylinder 9 has a transverse dimension such that when in a first end-of-stroke position (FIG. 5), a first face 9A thereof faces the port 11, whereas when in a second end-of-stroke position (FIG. 5C) a second face 9B thereof faces the port 11. The first and the second chamber are each connected to a valving element 15 openable when the oil pressure in the chamber exceeds a certain threshold.

In the example the configuration of the valving elements 15 comprises a seat for housing a ball 13 (acting as a valve) loaded by a spring 14. The spring load determines the pressure at which the fluid is expelled by the high pressure pump. In this case the exit pressure is high, between 10 and 100 bar.

The outlet of each valving element is connected to a pump delivery line 18. The piston 9 is operated by a piston rod 20, on the surface of which a plurality of seal elements 19 act. The pump operation is apparent to an expert of the art and will therefore not be described.

The pneumatic block 6B comprises a first and a second chamber 21A, 21B respectively housing a first and a second piston 23A, 223B. The first and the second piston are identical in the example and each comprise three maximum radius cross-section regions 24A, 24B, 24C divided into two reduced cross-section regions 25A, 25B. In each chamber 21A, 21B six seal elements 26 are present, cooperating with the pistons to define five chambers A1-A5, B1, B5.

Each piston also defines two further end chambers A0, A6, B0, B6. Passages P5, P6 and P7 are present, connecting the chamber A3 to B3, A1 to B1 and A5 to B5 respectively.

The chamber A1 is connected to a conduit 31 of pressurized air through a connection 30.

The chambers A3 and A5 are connected to discharge ports 32.

The passages shown schematically in FIGS. 5A-5D are also present: the passage P1 connects the chamber A2 to B6, the passage P2 connects the chamber A4 to B0, the passage P3 connects the chamber B2 to A0, and the passage P4 connects the chamber B4 to A6.

Figure 5B:
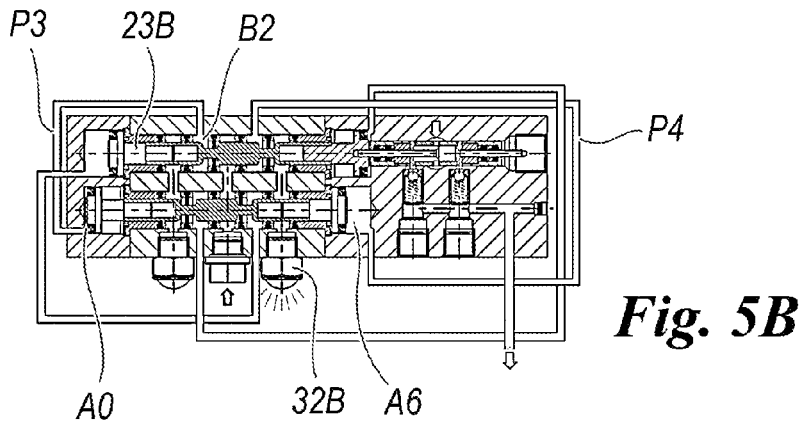
FIGS. 5A-5D show a series of operative states of the pump of FIG. 4.

The second piston 23A operates the hydraulic pump via the piston rod 20. The pump operation is described in FIGS. 5A-5D. In FIG. 5A both pistons are on the left. In practice the chambers A0 and B0 are at minimum volume.

FIG. 5A—Compressed air penetrates into the chambers A1 and B1, connected to the chambers B4 and A4. The pressure in B4 does not cause the piston 23A to move because the chamber A6 is already under pressure. The presence of compressed air in the chamber A4 instead pressurizes the chamber B0 via P2 with consequent movement of the piston 23B towards the right (FIG. 5B). The air present therein discharges through P1 into A2, which is connected to A3, and consequently through the discharge port 32A.

Figure 5C:
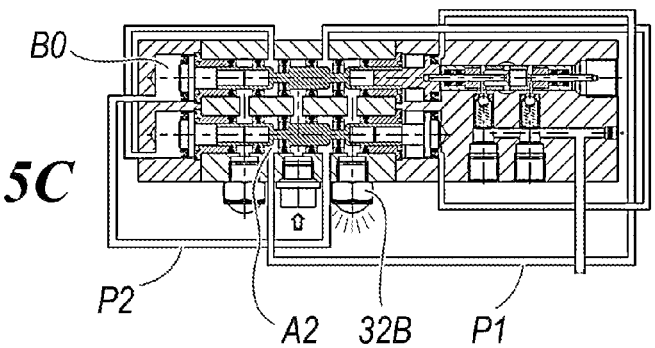

FIG. 5B—The movement of the second piston 23B pressurizes the chamber B2 and, via P3, pressurizes the chamber A0, with consequent movement of the piston 23A towards the right (FIG. 5C). The air present in A6 discharges through P4 into B4, then into B5, A5 and consequently through the discharge port 32B.

Figure 5D:
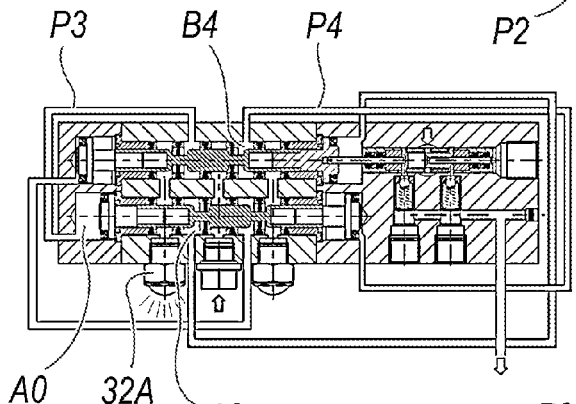
Figure 5A:
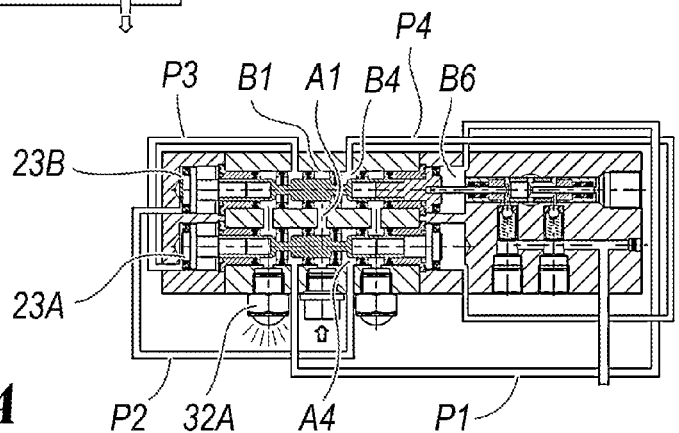

FIG. 5C—The movement of the first piston 23A pressurizes the chamber A2 and consequently, via P1, pressurizes the chamber B6, with consequent movement of the second piston 23B towards the left (FIG. 5D). The air present in B0 discharges through P2 into A4, and consequently through the discharge port 32B.

FIG. 5D—The movement of the second piston 23B pressurizes the chamber B4 and consequently, via P4, pressurizes the chamber A6, with consequent movement of the first piston 23A towards the left (FIG. 5A). The air present in A0 discharges through P3 into B2, then into B3, A3 and consequently through the discharge port 32A.

The pneumatic operation of the second piston 23B causes the piston 9 to move by means of the piston rod 20, to hence enable the lubricant fluid to be pumped.

The high pressure pump provides pressurized oil (advantageously between 10 and 100 bar) to the delivery line 18.

Below the pump a series of modular elements 50A, B, C, D, E are mounted resting one on another and fixed together and to the pump by a pair of through screws 61 housed in fixing holes provided through each modular element and at the pump.

The pump has a surface 70 provided with a hole 18 communicating with a delivery port of the pump and a hole 33 communicating with the compressed air feed 31.

Figure 6:
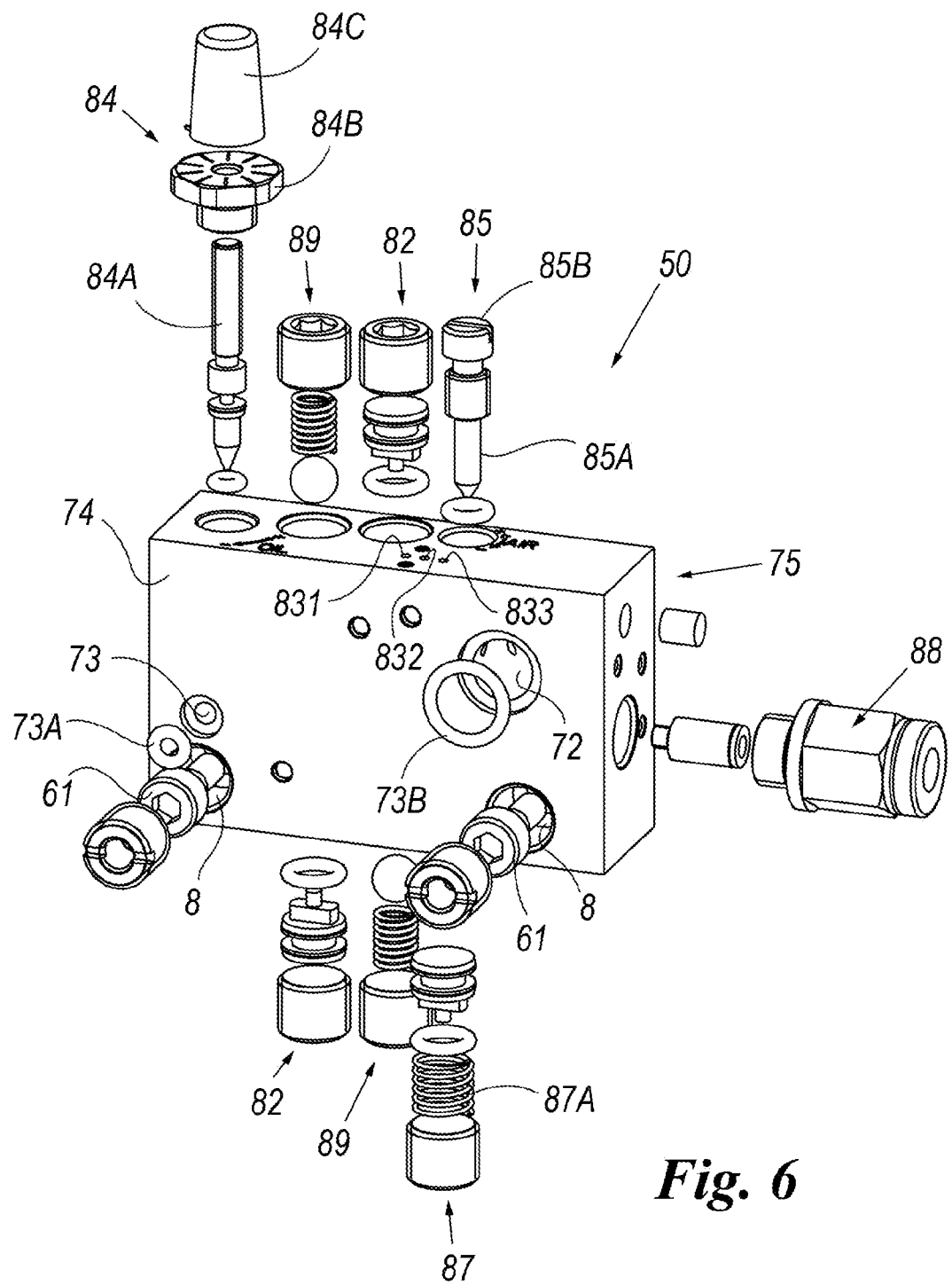
FIG. 6 is an exploded view of a modular oil/air mixer element of the present invention.

Each modular element (FIG. 6) presents a first passage 72 with its axis coinciding with the axis of the pump hole 33 and a second passage 73 with its axis coinciding with the axis of the pump hole 18. The passages 72 and 73 are through passages opening into both the surfaces 74 and 75 of the modular element.

When several modular elements are fixed to the pump as in FIG. 3, the passages 72 and 73 of each modular element define a pressurized oil conduit 81 and a compressed air conduit 80 connected respectively to the delivery port of the pump 6 and to a compressed air source or feed 31. Each modular element 50 draws from these conduits the compressed air and pressurized oil required for its operation.

Figure 7:
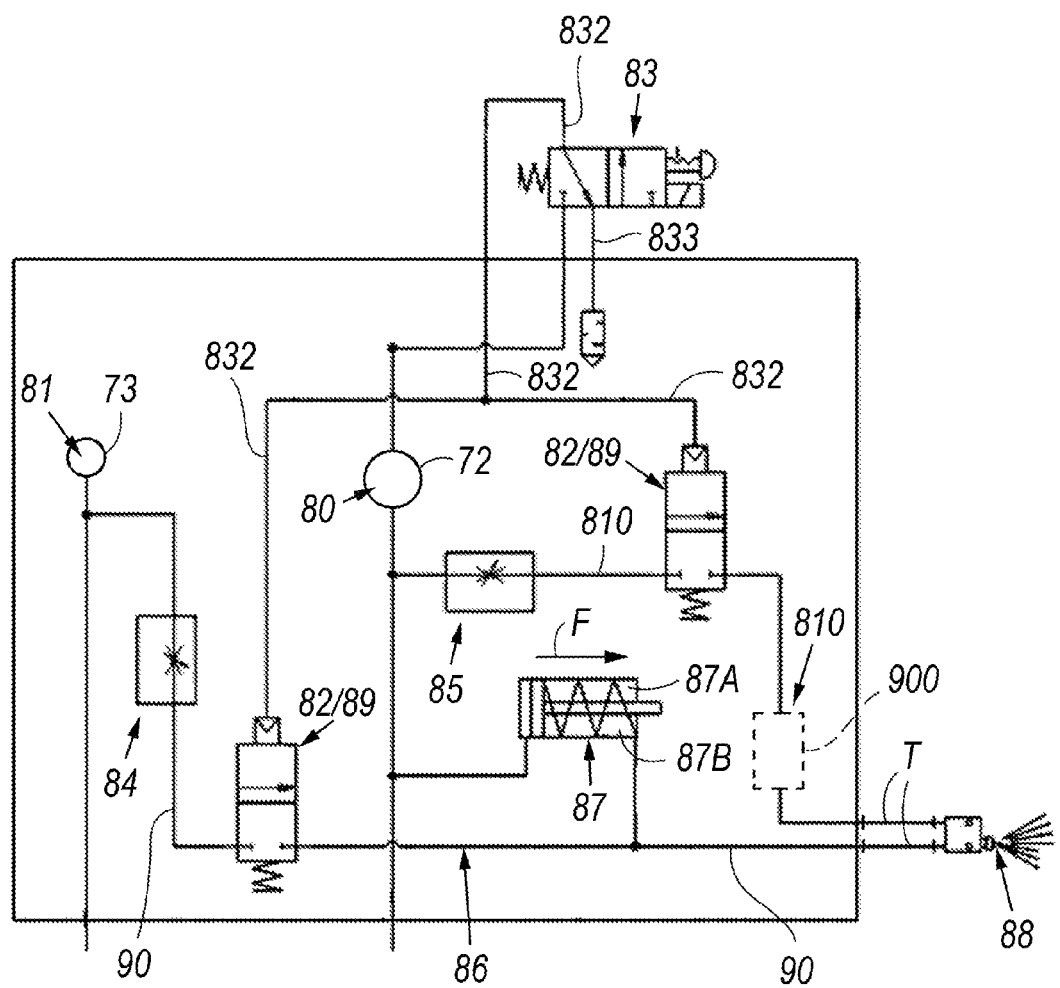
FIG. 7 shows a schematic circuit of the modular mixer element.

In particular, the schematic circuit of each modular element 50 is shown in FIG. 7. From this it can be seen that the lubricant delivered by the pump 6 passes through the conduit 81 to the flow regulator 84 which regulates the entering oil quantity. The flow regulator 84 presents a needle valving element 84A on which a graduated scale 84B and an operating knob 84C are mounted. The outlet line 90 from the flow regulator 84 opens towards a mixing element 88. It is intercepted by a shut-off element which in the example is a pilot piston 82 coupled to a spring-loaded valve 89 controlled by a solenoid valve 83. The conduit 90 also presents a branch connecting it to an anti-drip piston 87 further connected to the compressed air feed. When air is present in the conduit 80 it assumes the position shown by the arrow F (opposite to that illustrated, with the spring 87A compressed). When the conduit 80 is without pressure the spring 87A lengthens and the piston returns to the illustrated position to draw the lubricant present in the conduit 90 into a chamber 87B.

The conduit 80 communicates via the passage 72 with an air flow adjustment cock 85, the outlet of which opens into the mixing element 88 via a conduit 810. The cock 85 also presents a needle valving element 85A having a head 85B enabling it to be operated.

As in the preceding case, the conduit 810 is intercepted by a further pilot piston 82 with a spring-loaded valve 89 also controlled by the solenoid valve 83.

The entry conduit 831 of the solenoid valve 83 (optional, and not present for example in the elements 50D. 50E) communicates with the compressed air conduit 80. It is able to connect a conduit 832 controlling the pilot pistons 82 to a discharge line 833 (pistons 2 open and lines 86 and 810 operative), or to the entry conduit 831 (pistons 2 closed and lines 86 and 810 inoperative).

The mixing element 88 is essentially a nozzle which can be provided directly on each module 50 (FIG. 6), or can be connected to the respective module via suitable air and lubricant pipes T which bring it directly in proximity to the point at which lubrication is required. In the first case a single air/oil pipe is sufficient, extending from the module to the position of use.

In concluding the device description it should be noted that if the solenoid valve 83 is absent, the holes provided in each modular element 50 which derive from the conduits 831, 832 and 833 are closed by a plate 150. In that case the pilot pistons 82 are always in a position such as to enable fluids to pass into the conduits 90 and 810.

In addition the air cock 88 could also not be provided. Each module could then be fed by a different air source, the conduit 80 hence being absent.

The device operation is apparent to the expert of the art from the aforegoing description, and is as follows.

The pump 6 pressurizes the lubricant fluid (for example oil) withdrawn from the reservoir 2. The pump is operated by compressed air which is provided by the compressed air source 31. It feeds both air and oil to each of the modules 50 fixed to it in series, via the conduits 80 and 81 formed by passages provided directly within each of the modules and coupled together by means of gaskets 73A, 73B. The various modules are fixed together by screws 61 passing through suitable holes 8 provided in each module.

Each module provides for mixing a fluid quantity adjustable by the flow regulator 84. The air quantity delivered by each module can also be adjusted, by means of the cock 85.

In this manner a precise adjustment of the oil quantity delivered by each modular element 50 is achieved and, by means of a possible stroke counter for the piston 9 of the pump 6, the oil quantity fed to the group of modular elements or to each individually tested element can be monitored during tests. In this respect, at a stage prior to the use of the device one modular element 50 could be activated at a time and the delivered oil quantity (measured by the piston stroke counter) could be regulated. In this manner a precise adjustment of the oil quantity delivered by each element can be achieved, so combining the advantages of a positive displacement pumping system with those of a pressurized reservoir system.

Moreover advantageously the pump 6, because of the manner in which it is formed, is self-modulating on the basis of the lubricant requirement by the group of elements 50. If there is no lubricant requirement by these elements it ceases operation as the pressure in the compression chamber of the piston 9 equals that present in the oil conduit 81. When however one of the modules is activated the oil pressure in 81 decreases and then pump becomes activated.

In an improved embodiment, a vortex tube 900 is provided in the conduit 810 of each module (FIG. 7) to regulate the temperature of the air fed to the nozzle 88. In this manner, the temperature of the air fed to the nozzle 88 can be regulated by a suitable regulator screw. This enables a valid cooling effect to be achieved in addition to lubrication.

The invention claimed is:

1. A minimal lubrication device comprising:
    a storage reservoir for a lubricant liquid,
    a single high pressure pump module comprising a single high pressure pump for increasing pressure of said lubricant liquid to discharge pressurized liquid lubricant from said single high pressure pump module,
    said high pressure pump of said high pressure pump module having a lubricant liquid suction port for receiving said lubricant liquid from said reservoir, said pump having a lubricant liquid delivery port,
    at least one modular element for mixing a compressed air flow with the pressurized lubricant liquid from the pump module,
    a mixer element,
    wherein the single high pressure pump module is fixable to at least one said modular element and each modular element presents a lubricant liquid passage,
    each lubricant liquid passage being a through passage opening into respective opposed openings of surfaces of the at least one modular element such that said single pump lubricant liquid delivery port is connected to the lubricant liquid passage of the at least one modular element,
    wherein the at least one modular element comprises a flow regulator fed by the pressurized lubricant liquid originating from the single pump, wherein the flow regulator is a needle flow regulator, and
    wherein said modular element is connected to the mixer element for feeding the compressed air flow and the lubricant liquid to the mixer element to mix the compressed air flow with said lubricant.

2. A device as claimed in claim 1,
    wherein said single high pressure pump module presents a pump module surface to which a said modular element can be fixed,
    wherein the pump module surface has a lubricant liquid delivery hole communicating with the delivery port of said single pump for feeding the pressurized lubricant from the single pump to the modular element and an air delivery hole for feeding compressed air to the modular element, and the pump module has a compressed air inlet and a compressed air outlet, wherein the compressed air outlet is for discharging the compressed air through the air delivery hole, and
    each modular element presents an air passage having an axis coincident with an axis of the air delivery hole.

3. A device as claimed in claim 1, wherein said high pressure pump is a positive displacement pump.

4. A device as claimed in claim 3, wherein the lubricant liquid comprises lubricant oil, wherein said high pressure pump is for feeding to said modular element the oil at a pressure between 10 and 100 bar.

5. A device as claimed in claim 1, wherein said high pressure pump is driven by compressed air.

6. A device as claimed in claim 1, wherein the lubricant liquid comprises lubricant oil, wherein said modular element comprises a solenoid valve controlling a shut-off device for the oil flow and/or the air flow directed to said mixer element.

7. A device as claimed in claim 1, wherein said modular element presents a cock for adjusting the air flow fed into said mixer element.

8. A device as claimed in claim 7, wherein the lubricant liquid comprises lubricant oil, wherein said modular element presents an anti-drip element adapted to store the oil if compressed air is absent.

9. A device as claimed in claim 1, wherein the lubricant liquid comprises lubricant oil, wherein said modular element comprises fixing means enabling said modular element to be fixed to other identical modular elements and/or to said high pressure pump module, wherein said modular element presents a further surface for fixing a said further identical modular element, said further surface presenting a first lubricant liquid delivery hole for feeding pressurized oil directly from said single pump to the further modular element, and optionally a second air delivery hole for feeding compressed air.

10. A device as claimed in claim 1, wherein said reservoir is mounted on a plate comprising a plate surface to which said single pump module is secured, said surface comprising a first hole for feeding oil from said reservoir to said single pump.

11. A device as claimed in claim 10, the single pump module having a compressed air inlet for receiving compressed air from a compressed air feed and a compressed air outlet, wherein the lubricant liquid comprises lubricant oil, wherein said single pump module presents a surface to which a said modular element can be fixed, said surface comprising a first lubricant liquid delivery hole communicating with the lubricant liquid delivery port of said single pump for feeding the pressurized oil to the modular element and optionally a second air delivery hole for feeding compressed air to the modular element.

12. A device as claimed in claim 1, wherein the lubricant liquid comprises lubricant oil, wherein said modular element presents a further surface for fixing a further identical modular element, said further surface presenting a first lubricant liquid delivery hole for feeding pressurized oil directly from said single pump to the further modular element, and a second air delivery hole for feeding compressed air.

13. A device as claimed in claim 1, wherein the lubricant liquid comprises lubricant oil, wherein several modular elements fixed together define a pressurized oil conduit and/or a compressed air conduit connected respectively to the pump delivery port and to a compressed air source, each modular element drawing compressed air and pressurized lubricant from said conduits.

14. A device as claimed in claim 1, wherein said single pump comprises a body housing a pair of cylinders operated by compressed air, one of which is rigid with a further cylinder for pumping the lubricant fluid.

15. A device as claimed in claim 1, wherein said modular element comprises a vortex tube arranged to lower the temperature of the air flow with which said lubricant is to be mixed.

* * * * *